United States Patent
Gouji (10) Patent No.: US 10,951,832 B2
(45) Date of Patent: Mar. 16, 2021

(54) IMAGE PICKUP APPARATUS THAT PERFORMS CONTINUOUS FLASH SHOOTING, LIGHT-EMITTING APPARATUS, IMAGE PICKUP SYSTEM, CONTROL METHOD FOR THEM, AND STORAGE MEDIUM

(71) Applicant: CANON KABUSHIKI KAISHA, Tokyo (JP)

(72) Inventor: Kazunori Gouji, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/446,742

(22) Filed: Jun. 20, 2019

(65) Prior Publication Data

US 2019/0394381 A1 Dec. 26, 2019

(30) Foreign Application Priority Data

Jun. 26, 2018 (JP) .............................. JP2018-121069

(51) Int. Cl.
*H04N 5/235* (2006.01)
*H04N 5/232* (2006.01)
*H04N 5/225* (2006.01)

(52) U.S. Cl.
CPC ......... *H04N 5/2353* (2013.01); *H04N 5/2354* (2013.01); *H04N 5/23245* (2013.01)

(58) Field of Classification Search
CPC ............. H04N 5/23245; H04N 5/2354; H04N 5/353–3537
See application file for complete search history.

(56) References Cited

U.S. PATENT DOCUMENTS

2007/0189754 A1* 8/2007 Iwasaki ................ H04N 5/2256
396/182

FOREIGN PATENT DOCUMENTS

| CN | 101004536 A | 7/2007 |
| CN | 101510043 A | 8/2009 |
| CN | 205647743 U | 10/2016 |
| JP | 4547465 B2 | 9/2010 |
| JP | 5332304 B2 | 11/2013 |

OTHER PUBLICATIONS

Office Action issued in Chinese Appln. No. 201910554348.8 dated Jan. 14, 2021. English translation provided.

\* cited by examiner

*Primary Examiner* — Christopher K Peterson
(74) *Attorney, Agent, or Firm* — Rossi, Kimms & McDowell LLP (57) ABSTRACT

An image pickup apparatus which is capable of setting shooting conditions suitable for continuous flash shooting. The image pickup apparatus is connected to a light-emitting apparatus and causes the light-emitting apparatus to emit light when shooting. A light emission mode of the light-emitting apparatus is obtained from the light-emitting apparatus. Exposure control values including at least a shooting sensitivity for use in shooting in a first light emission mode in which automatic light control are determined. In a case where the light emission mode of the light-emitting apparatus is a second light emission mode in which automatic light control for continuous shooting is performed, the determined shooting sensitivity is changed to a greater value before the automatic light control.

16 Claims, 4 Drawing Sheets

IMAGE PICKUP APPARATUS THAT PERFORMS CONTINUOUS FLASH SHOOTING, LIGHT-EMITTING APPARATUS, IMAGE PICKUP SYSTEM, CONTROL METHOD FOR THEM, AND STORAGE MEDIUM

BACKGROUND OF THE INVENTION

Field of the Invention

The present invention relates to an image pickup apparatus, a light-emitting apparatus, an image pickup system, and a control method for them, as well as a storage medium, and in particular to an image pickup apparatus that performs continuous flash shooting, a light-emitting apparatus, an image pickup system, and a control method for them, as well as a storage medium.

Description of the Related Art

A camera which is an image pickup apparatus taking still images of a subject is known. When the subject has a low brightness, this type of camera changes a photographic sensitivity to take a shot, but when appropriate exposure cannot be attained even by changing photographic sensitivities, takes a shot by illuminating the subject with a flash.

As for a method to control photographic sensitivities and the amount of light a flash emits, a method that switches photographic sensitivities based on a focus position of a taking lens in a camera has been disclosed (see, for example, Japanese Patent No. 4547465).

Another method has been disclosed that calculates the amount of light a flash emits at the time of shooting based on a result of preflash, compares the calculated amount of light with a predetermined amount, and when the amount of light calculated based on the result of preflash is larger than the predetermined amount, emits the predetermined amount of light, and compensate the difference by a photographic sensitivity (see, for example, Japanese Patent No. 5332304).

According to the conventional art disclosed in Japanese Patent No. 4547465, however, the amount of light the flash emits may reach a maximum amount depending on shooting conditions, and when shots are continuously taken with the flash, illuminating a subject with a flash of light may become impossible due to a dead battery. Also, according to the conventional art disclosed in Japanese Patent No. 5332304, the photographic sensitivity changes are given after emission of a preflash after a shooting instruction, and hence a user cannot check the photographic sensitivity before taking a shot.

SUMMARY OF THE INVENTION

The present invention provides an image pickup apparatus, a light-emitting apparatus, an image pickup system, and a control method for them, which are capable of setting shooting conditions suitable for continuous flash shooting, as well as a storage medium.

Accordingly, the present invention according to claim 1 provides an image pickup apparatus that is connected to a light-emitting apparatus and causes the light-emitting apparatus to emit light when shooting, comprising a memory device that stores a set of instructions, and at least one processor that executes the instructions to: obtain a light emission mode of the light-emitting apparatus from the light-emitting apparatus; determine exposure control values including at least a shooting sensitivity for use in shooting in a first light emission mode in which automatic light control is performed; and in a case where the obtained light emission mode of the light-emitting apparatus is a second light emission mode in which automatic light control for continuous shooting is performed, change the determined shooting sensitivity to a greater value before the automatic light control.

Accordingly, the present invention according to claim 6 provides a light-emitting apparatus that is connected to an image pickup apparatus and emits light when shooting is performed with the image pickup apparatus, comprising a memory device that stores a set of instructions, and at least one processor that executes the instructions to set, as a light emission mode, one of a plurality of light emission modes including at least a first light emission mode in which automatic light control is performed and a second light emission mode in which automatic light control for continuous shooting is performed, wherein the plurality of light emission modes is selectable by the user independently of one another as the light emission modes that should be set.

Accordingly, the present invention according to claim 9 provides an image pickup system that is comprised of a light-emitting apparatus and an image pickup apparatus which takes a shot by causing the light-emitting apparatus to emit light, the image pickup system comprising a memory device that stores a set of instructions, and at least one processor that executes the instructions, wherein in the light-emitting apparatus, the at least one processor executes the instructions to: set, as a light emission mode, one of a plurality of light emission modes including at least a first light emission mode in which automatic light control is performed and a second light emission mode in which automatic light control for continuous shooting is performed; and notify the image pickup apparatus of the light emission mode set in the light emission mode among the plurality of light emission modes, and wherein in the image pickup apparatus, the at least one processor executes the instructions to: determine exposure control values including at least a shooting sensitivity for use in shooting in the first light emission mode; and in a case where the notified light emission mode is the second light emission mode, change the determined shooting sensitivity to a greater value before the automatic light control.

According to the present invention, it is possible to set shooting conditions suitable for continuous flash shooting.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

Figure 1:
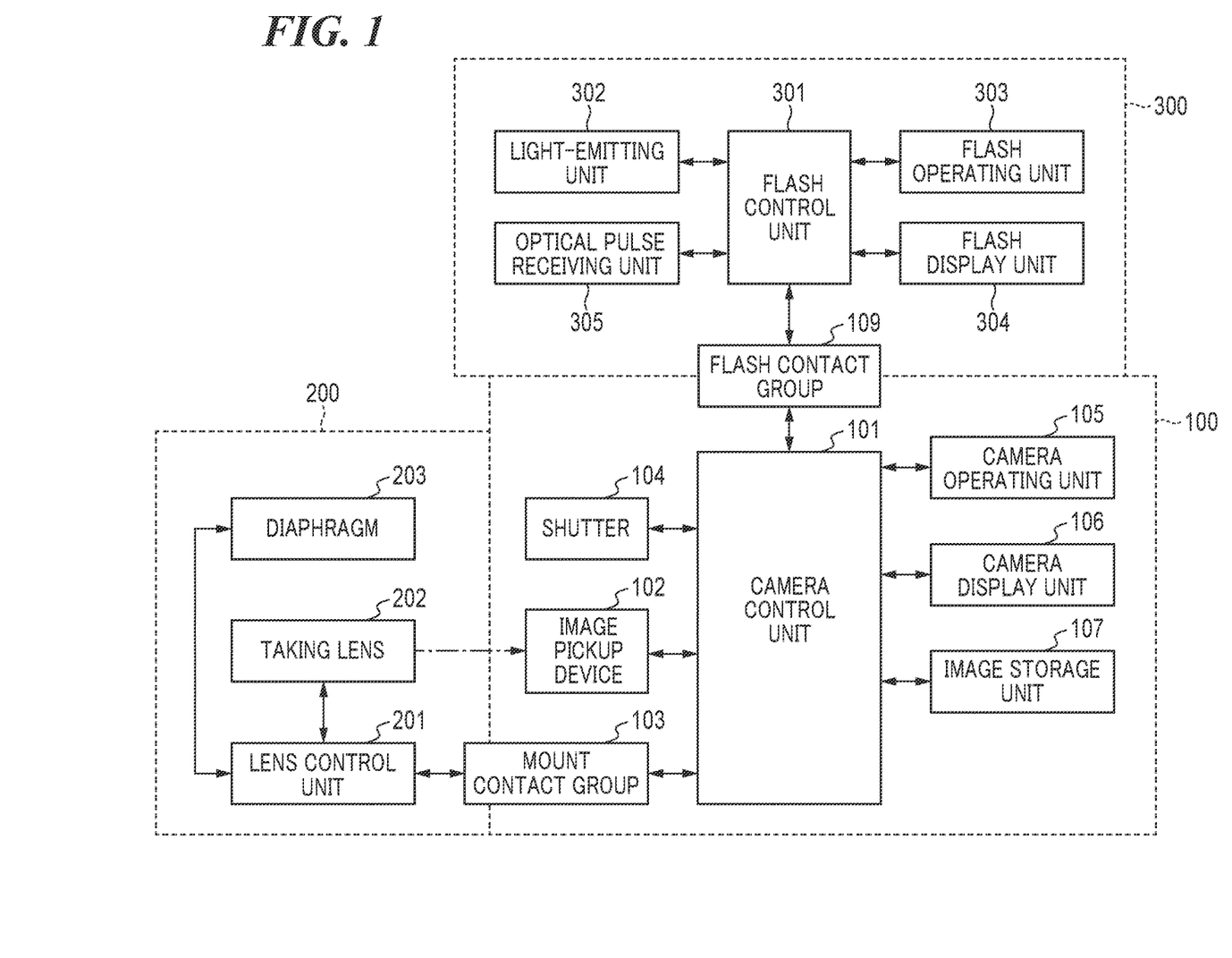
FIG. 1 is a block diagram showing an example of an arrangement of an image pickup system according to the present invention.

FIG. 1 is a block diagram showing an example of an arrangement of an image pickup system according to the present invention.

Referring to FIG. 1, the image pickup system is comprised of a camera 100 which is an image pickup apparatus, a lens unit 200, and a flash apparatus 300 which is a light-emitting apparatus.

The lens unit 200 is interchangeably mounted on the camera 200 and electrically connected to the camera 100 via a mount contact group 103 of the camera 100.

The flash apparatus 300 is also interchangeably mounted on the camera 200 and electrically connected to the camera 100 via a flash contact group 109 of the camera 100.

A description will now be given of an internal arrangement of the camera 100.

A camera control unit 101 is a microcomputer which controls operation of components of the camera 100.

An image pickup device 102 converts light from a subject, which enters the image pickup device 102 through a taking lens 202 of the lens unit 200 to be described later, into an electric signal to generate image data and outputs the image data to the camera control unit 101.

A focal plane shutter 104 (hereafter referred to as the shutter 104) is disposed between the image pickup device 102 and the taking lens 202 and operates in accordance with instructions from the camera control unit 101. The shutter 104 is comprised of a front curtain and a rear curtain. Exposure of the image pickup device 102 to light is started by the front curtain travelling to open the shutter 104, and exposure of the image pickup device 102 to light is ended by the rear curtain travelling to close the shutter 104.

A camera operating unit 105 detects an operation performed by a user via operating members such as a release button, a switch, a dial, and a connecting device (not shown in FIG. 1) mounted on the camera 100 and sends a signal corresponding to an operating instruction to the camera control unit 101. For example, when the user performs a half pressing operation in which the release button is pressed halfway down, the camera operating unit 105 outputs an SW1 signal to the camera control unit 101, and when the user performs a full pressing operation in which the release button is pressed all the way down, the camera operating unit 105 outputs an SW2 signal to the camera control unit 101.

A camera display unit 106 displays shooting information and displays taken images, in accordance with instructions from the camera control unit 101.

The camera control unit 101 controls operation of the camera 100 based on output signals from the camera operating unit 105. In a case where the camera operating unit 105 outputs the SW1 signal, the camera control unit 101 drives the image pickup device 102 to pick up an image and performs an AE operation. The camera control unit 101 performs the AE operation to repeatedly carry out photometric control that measures a brightness of a subject based on a result of the image pickup by the image pickup device 102, and based on photometric results, determines a shutter speed, an f-number, and an ISO sensitivity for use in shooting. Here, the shutter speed, the f-number, and the ISO sensitivity for use in shooting are collectively referred to as exposure control values. The determined exposure control values are displayed on a screen of the camera display unit 106. On the other hand, in a case where the camera operating unit 105 outputs the SW2 signal, the camera control unit 101 drives a diaphragm 203 of the lens unit 200, to be described later, sets a sensitivity of the image pickup device 102 (ISO sensitivity), and controls the shutter 104 to irradiate the image pickup device 102 with light. In accordance with image data obtained from the image pickup device 102, the camera control unit 101 provides control to display a taken image on the screen of the camera display unit 106 and writes the image data into an image storage unit 107.

A description will now be given of an internal arrangement of the lens unit 200.

A lens control unit 201 is a microcomputer which controls operation of components of the lens unit 200. The taking lens 202 is comprised of a plurality of lenses and forms a subject image on the image pickup device 102. The diaphragm 203 for adjusting the amount of light and a focus lens (not shown) for adjusting a focus are provided in the taking lens 202.

By control via the mount contact group 103, in accordance with instructions from the camera control unit 101, the lens control unit 201 adjusts the amount of light to be taken into the camera 100 as well as a focus.

A description will now be given of an internal arrangement of a flash apparatus 300.

A flash control unit 301 is a microcomputer which controls components of the flash apparatus 300. The flash control unit 301 is capable of communicating with the camera control unit 101 via the flash contact group 109 to receive a light emission control instruction and camera information from the camera 100 and send flash information to the camera 100. A light-emitting unit 302 is comprised of a discharge tube, a light emission capacitor, a light-emitting circuit, a light emission optical system (not shown in FIG. 1) and is able to fire a flash. A flash operating unit 303 detects operations performed by the user via operating members (not shown in FIG. 1) such as a button and a dial mounted on the flash apparatus 300 and sends a signal corresponding to an operating instruction to the flash control unit 301. A flash display unit 304 displays a light emission mode or the like in accordance with an instruction from the flash control unit 301.

An optical pulse receiving unit 305 receives an optical pulse emitted from a light-emitting unit of another flash apparatus and outputs a reception result to the flash control unit 301.

In accordance with an instruction from the flash control unit 301, the light-emitting unit 302 drives the light-emitting circuit and discharges energy that has charged the light-emitting capacitor to the discharge tube to emit light, which in turn illuminates a subject via the light-emitting optical system. The amount of light to be emitted by the light-emitting unit 302 may be determined using the flash operating unit 303 or may be obtained from the camera control unit 101 through communication via the flash contact group 109. In accordance with an instruction issued from the camera control unit 101 via the flash contact group 109, the flash control unit 301 causes the light-emitting unit 302 to emit a predetermined amount of light in synchronization with a shooting operation of the camera 100. The flash control unit 301 converts data as information into a constant optical pulse pattern, and sends the data to the other flash apparatus by driving the light-emitting unit 302 to emit the optical pulse pattern toward the other flash apparatus. Based on a result of the reception of the optical pulse output from the optical pulse receiving unit 305 that has received the optical pulse emitted by another flash apparatus, the flash control unit 301 analyzes the pattern of the optical pulse emitted by the other flash apparatus. As a result, the flash control unit 301 identifies the content of the data sent as the pattern of the optical pulse by the other flash apparatus. For example, in a case where the identified content of the data is a light-emitting instruction, the flash control unit 301 drives the light-emitting unit 302 to emit light which conforms to the light-emitting instruction.

Figure 2:
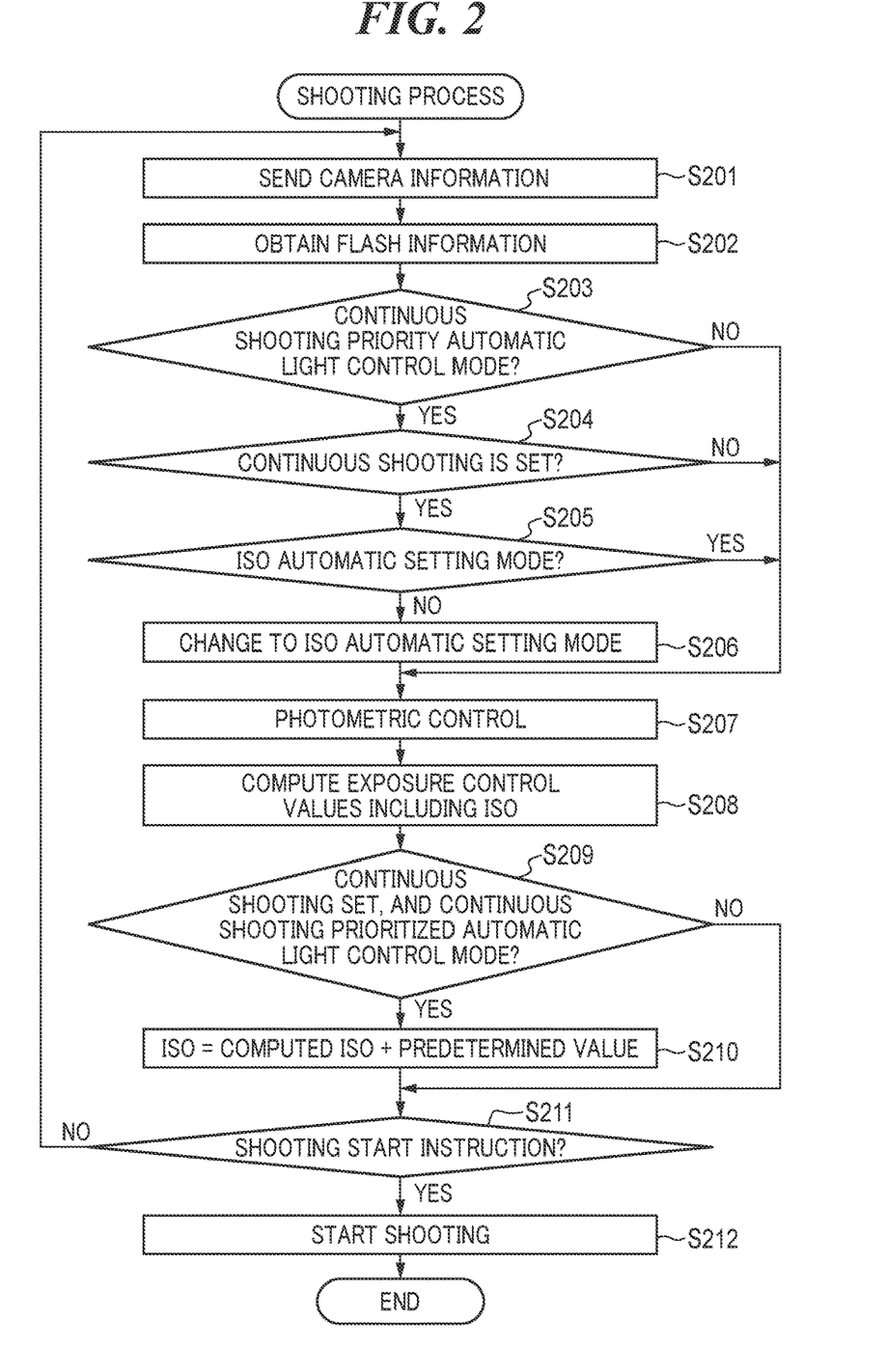
FIG. 2 is a flowchart showing the procedure of a shooting process which is carried out by an image pickup apparatus according to a first embodiment of the present invention.

Referring to a flowchart of FIG. 2, a description will now be given of a shooting process which is carried out in the camera 100 according to a first embodiment of the present invention. FIG. 2 is a flowchart in which mainly the camera control unit 101 reads a program from a ROM (not shown) in the camera 100 and executes it. In the present embodiment, the shooting process is started when the flash apparatus 300 is mounted on the camera 100.

First, in step S201, the camera control unit 101 sends camera information to the flash apparatus 300. Here, the camera information includes light emission modes supported by the camera 100.

In step S202, the camera control unit 101 receives flash information from the flash apparatus 300. Here, the flash information includes a user-selected light emission mode (hereafter referred to as a light emission mode of the flash apparatus 300) among the light emission modes supported by the flash apparatus 300. In the present embodiment, both the camera 100 and the flash apparatus 300 support three light emission modes consisting of an automatic light control mode (first light emission mode, first automatic light control state), a continuous shooting priority automatic light control mode (second light emission mode, second automatic light control state), and a manual light emission mode. Here, the automatic light control mode is a mode in which the camera 100 automatically determines the amount of light to be emitted, the continuous shooting priority automatic light control mode is a mode in which the camera 100 automatically determines the amount of light to be emitted which is suitable for continuous shooting, and the manual light emission mode is a mode in which the user designates the amount of light to be emitted. A well known method such as a method that determines the amount of light to be emitted by comparing a result of photometry of steady light and a result of photometry at the time of pre-flash can be used to automatically control light. Details of how information on the light emission modes is transmitted and received in the steps S201 and S202 described above will be given later with reference to FIG. 3. It should be noted that although in the present embodiment, both the camera 100 and the flash apparatus 300 support the three light emission modes described above, the camera 100 and the flash apparatus 300 have only to support at least the automatic light control mode and the continuous shooting priority automatic light control mode.

In step S203, based on the flash information received in the step S202, the camera control unit 101 judges whether or not the light emission mode of the flash apparatus 300 is the continuous shooting priority automatic light control mode. In a case where the light emission mode of the flash apparatus 300 is the continuous shooting priority automatic light control mode, the process proceeds to step S204, and when not, the process proceeds to step S207.

In the step S204, the camera control unit 101 judges whether or not continuous shooting is set for the camera 100. In a case where continuous shooting is set for the camera 100, the process proceeds to step S205, and in a case where the continuous shooting is not set for the camera 100, the process proceeds to step S207. The user can set continuous shooting by operating the camera operating unit 105, and a setting value is displayed on the camera display unit 106.

In the step S205, the camera control unit 101 makes a judgment as to a setting mode for a shooting sensitivity (ISO sensitivity) for use at the time of shooting, which is set for the camera 100. Specifically, the camera control unit 101 judges whether the setting mode is an ISO automatic setting mode (automatic setting mode) in which the ISO sensitivity is set at a value computed in step S208, to be described later, or an ISO manual setting mode (manual setting mode) in which the ISO sensitivity is set at an manual value set by the user. In a case where the ISO automatic setting mode is set on the camera 100, the process proceeds to the step S207, and in a case where the ISO manual setting mode is set on the camera 100, the process proceeds to step S206. It should be noted that in a case where the ISO manual setting mode is set on the camera 100, the user can set a value of an ISO sensitivity for use at the time of shooting by operating the camera operating unit 105, and a range of numeric values that can be set is displayed on the camera display unit 106.

In the step S206, the camera control unit 101 changes the setting mode for the ISO sensitivity of the camera 100 from the ISO manual setting mode to the ISO automatic setting mode. By changing the setting mode to the ISO automatic setting mode, the camera control unit 101 is able to freely change the ISO sensitivity in step S210 as will be described later. Further, upon judging in the step S203 that the light emission mode of the flash apparatus 300 is the continuous shooting priority automatic light control mode, the camera control unit 101 disables changing of the setting on the ISO sensitivity by the user (disable unit). At this time, to notify the user that it has become impossible to change the setting on the ISO sensitivity, for example, the ISO sensitivity displayed on the camera display unit 106 can be blinked as a warning (disable notification unit).

In the step S207, the camera control unit 101 provides photometric control in which the camera control unit 101 measures the brightness of the subject. Here, the photometric control means such control that the image pickup device 102 is driven to pick up an image, and the brightness of the subject is measured from the picked-up image as a result of the pick-up.

In the step S208, based on the photometric result obtained in the step S207, the camera control unit 101 computes exposure control values such as a shutter speed, an f number, and an ISO sensitivity for use at the time of shooting in the automatic light control mode.

In step S209, the camera control unit 101 judges whether or not continuous shooting is set for the camera 100, and the light emission mode included in the flash information received in the step S202 is the continuous shooting priority automatic light control mode. In a case where continuous shooting is set for the camera 100, and the light emission mode included in the flash information is the continuous shooting priority automatic light control mode, the process proceeds to the step S210, and when not, the process proceeds to step S211.

In the step S210, the camera control unit 101 performs a computation in which it adds a predetermined value to the ISO sensitivity computed in the step S208 and sets a computation result as a new ISO sensitivity (changing unit). After that, the camera control unit 101 re-computes the shutter speed and the f-number computed in the step S208 based on a flash program diagram held in advance in the ROM, not shown, of the camera 100 and displays the ISO sensitivity computed in the step S210 and the re-computed shutter speed and f-number on the camera display unit 106 (change notification unit). By seeing the display on the camera display unit 106, the user knows the exposure control values for use at the time of shooting, in particular, the changed shooting sensitivity.

In the step S211, the camera control unit 101 judges whether or not a shooting start instruction has been received. For example, in a case where the user has pressed the release button all the way down to turn the SW2 signal on, the camera control unit 101 judges that the shooting start instruction has been received. In a case where the camera control unit 101 judges that the shooting start instruction has been received, the process proceeds to step S212, and when not, the process returns to the step S201.

In the step S212, the camera control unit 101 starts shooting in the light emission mode of the flash apparatus 300 (shooting start unit) and ends the present process. Specifically, when the light emission mode of the flash apparatus 300 is the automatic light control mode, shooting is performed in the step S212 using the shutter speed, the f-number, and the ISO sensitivity computed in the step S208. In a case where the light emission mode of the flash apparatus 300 is the continuous shooting priority automatic light control mode, continuous shooting is performed in the step S212 using the shutter speed and the f-number computed in the step S208 and the ISO sensitivity computed in the step S210. The flash apparatus 300 is able to flash a fire in synchronization with shooting. In a case where the light emission mode of the flash apparatus 300 is the automatic light control mode or the continuous shooting priority automatic light control mode, the camera control unit 101 determines the amount of light in a flash to be emitted (automatic light control) and sends a value of the determined amount of light in a flash to be emitted to the flash control unit 301 via the flash contact group 109. For example, the image pickup device 102 is driven to pick up an image at the same time as firing of a pre-flash between pressing of the release button all the way down to shooting, and the amount of light in a flash to be emitted is determined using a well-known automatic light control method based on the result of the image pickup and a shutter speed, an f-number, and an ISO sensitivity used for the shooting.

Figure 3:
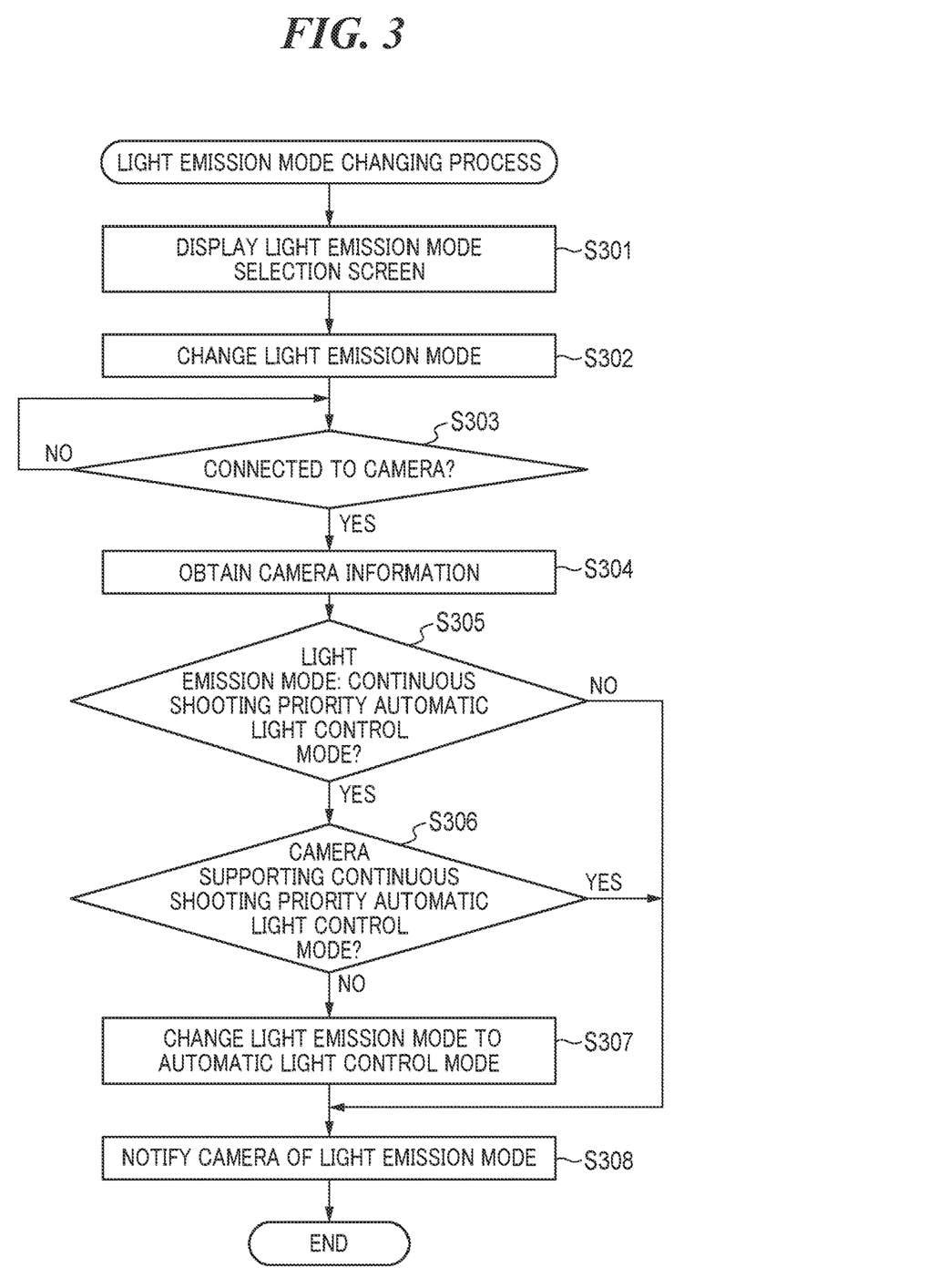
FIG. 3 is a flowchart showing the procedure of a light emission mode changing process which is carried out by a flash apparatus according to the first embodiment of the present invention.

Referring to a flowchart of FIG. 3, a description will be given of a light emission mode changing process which is carried out in the flash apparatus 300. The flowchart of FIG. 3 is implemented mainly by the flash control unit 301 reading a program from a ROM (not shown) in the flash apparatus 300 and executing it.

First, in step S301, the flash control unit 301 displays a light emission mode selection screen on the flash display unit 304. Light emission modes displayed here are those controllable in the flash apparatus 300, and more specifically, the automatic light control mode, the continuous shooting priority automatic light control mode, and the manual light emission mode. With the flash operating unit 303, the user can select any one of the light emission modes, which are displayed on the flash display unit 304, independently of one another.

In step S302, the flash control unit 301 sets or switches to the light emission mode selected by the user with the flash operating unit 303.

In step S303, the flash control unit 301 judges whether or not the flash apparatus 300 is connected to the camera 100 via the flash contact group 109. In a case where it is judged that the flash apparatus 300 is connected to the camera 100, the process proceeds to step S304, and when not, the flash control unit 301 performs the step S303 again and waits until the flash apparatus 300 is connected to the camera 100.

In the step S304, the flash control unit 301 receives the camera information sent from the camera control unit 101 of the camera 100 in the step S201 in FIG. 2 (receiving unit).

In the step S305, the flash control unit 301 judges whether or not the light emission mode set or changed in the step S302 is the continuous shooting priority automatic light control mode. In a case where the light emission mode is the continuous shooting priority automatic light control mode, the process proceeds to step S306, and when not, the process proceeds to step S308.

In the step S306, based on the camera information received in the step S304, the flash control unit 301 judges whether or not the camera 100 to which the flash apparatus 300 is connected supports the continuous shooting priority automatic light control mode. In a case where the camera 100 supports the continuous shooting priority automatic light control mode, the process proceeds to the step S308, and when not, the process proceeds to the step S307.

In the step S307, the flash control unit 301 changes the light emission mode to the automatic light control mode. The light emission mode may be either temporarily or permanently changed. Here, temporarily changing the light emission mode means applying the automatic light control mode as the light emission mode only while the flash apparatus 300 is connected to the camera 100, and reverting the light emission mode to the continuous shooting priority automatic light control mode when removal of the flash apparatus 300 from the camera 100 is detected. Permanently changing the light emission mode means applying in the automatic light control mode as the light emission mode until the user selects the light emission mode again through the light emission mode selection screen displayed again on the flash display unit 304.

In the step S308, the flash control unit 301 sends the flash information to be received by the camera control unit 101 of the camera 100 in the step S202 in FIG. 2 (mode notification unit) and ends the present process.

By providing control described above, in a case where the light emission mode of the flash apparatus 300 is the continuous shooting priority automatic light control mode, the ISO sensitivity is increased by a predetermined amount from the ISO sensitivity computed by the camera control unit 101 before the automatic light control. More specifically, the ISO sensitivity, in a case where it is prior to the automatic light control, and the continuous shooting is set for the camera 100, is adjusted. This reduces the amount of light emitted in a flash at the time of shooting, which is determined by firing of a pre-flash in the step S212, as compared to the case where the light emission mode is the automatic light control mode, and as a result, continuous flash shooting is reliably performed. Moreover, since the changing of the ISO sensitivity is completed before it is judged whether or not the user has given the shooting start instruction, the user is able to check a shooting sensitivity for use in continuous flash shooting before shooting.

In addition, even in a case where the ISO sensitivity setting mode is the ISO manual setting mode (NO in the step S205), the ISO sensitivity setting mode is changed to the ISO automatic setting mode in a case where the light emission mode of the flash apparatus 300 is the continuous shooting priority automatic light control mode (YES in the step S203) (step S206). This saves the user the trouble of changing the ISO sensitivity computed in the step S208 to the ISO sensitivity computed in the step S210.

Furthermore, in the flash apparatus 300, the user is allowed to select the continuous shooting priority automatic light control mode independently as one of the light emission modes (step S301). This makes it possible to clearly state to the user that the step of controlling the ISO sensitivity of the camera 100 in the continuous shooting priority automatic light control mode is different from those in the other light emission modes.

Moreover, even in a case where the user-selected light emission mode is the continuous shooting priority automatic light control mode, the light emission mode is changed to the automatic light control mode in a case where the camera 100 on which the flash apparatus 300 is mounted does not support the continuous shooting priority automatic light control mode (NO in the step S306) (step S307). This saves the user the trouble of changing the light emission mode. On this occasion, the changed light emission mode may be displayed on the flash display unit 304. This enables the user to easily check the light emission mode for shooting. It should be noted that in a case where the light emission mode of the flash apparatus 300 is the continuous shooting priority automatic light control mode, exposure control values other than the ISO sensitivity may be changed so as to obtain high exposure.

Figure 4:
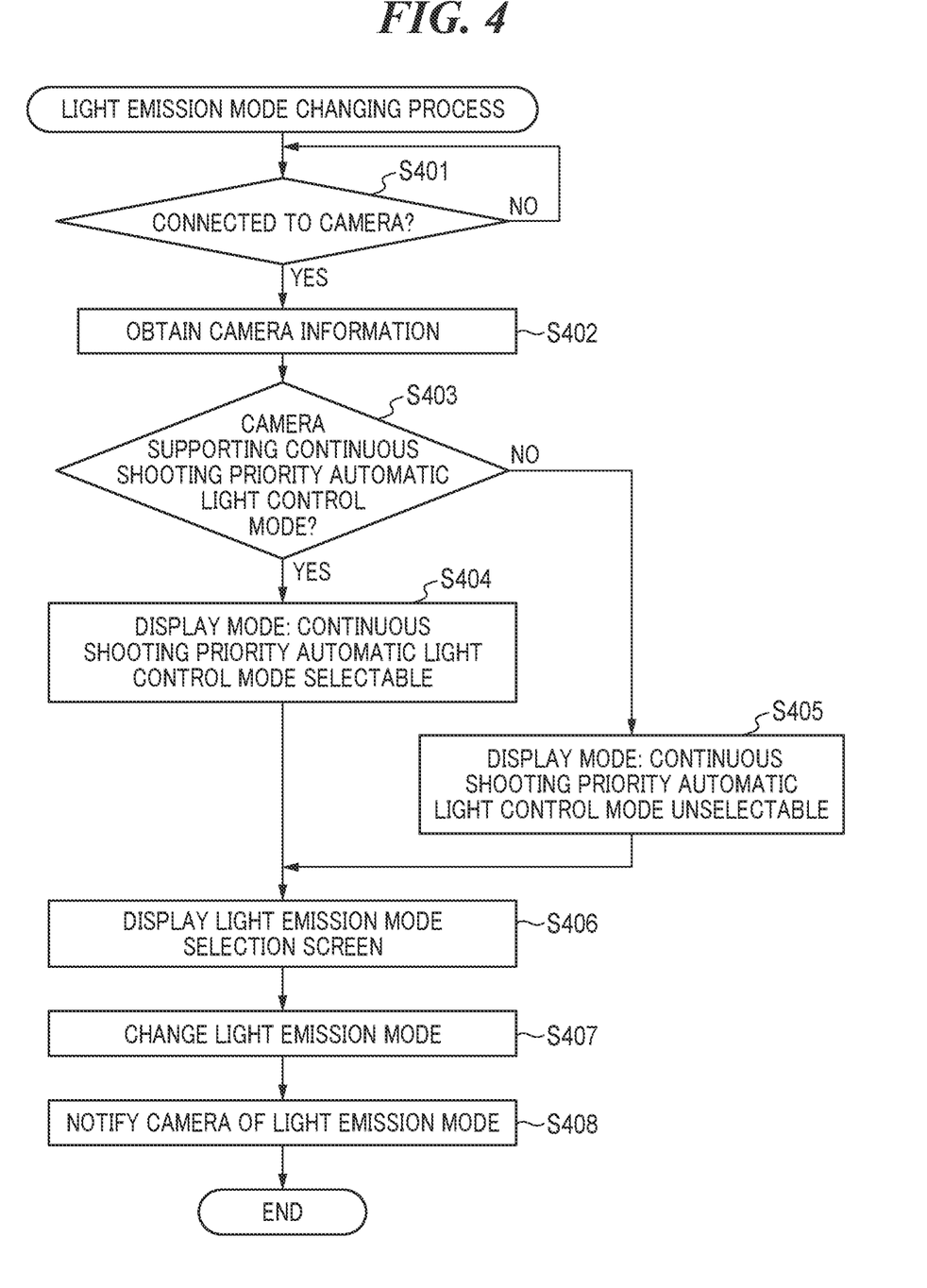
FIG. 4 is a flowchart showing the procedure of a light emission mode changing process which is carried out by a flash apparatus according to a second embodiment of the present invention.

Next, referring to a flowchart of FIG. 4, a description will be given of a light emission mode changing process which is carried out in the flash apparatus 300 according to a second embodiment of the present invention. The flowchart of FIG. 4, which is an alternative to the flowchart of FIG. 3, is implemented by the flash control unit 301 of the flash apparatus 300 reading a program from the ROM (not shown) in the flash apparatus 300 and executing it. Namely, a hardware arrangement according to the present embodiment is comprised of the same image pickup system as that in the first embodiment.

First, in step S401, the flash control unit 301 judges whether or not the flash apparatus 300 is connected to the camera 100 via the flash contact group 109. In a case where it is judged that the flash apparatus 300 is connected to the camera 100, the process proceeds to step S402, and when not, the flash control unit 301 performs the step S401 again and waits until the flash apparatus 300 is connected to the camera 100.

In the step S402, the flash control unit 301 receives the camera information sent from the camera control unit 101 of the camera 100 in the step S201 in FIG. 2.

In the step S403, based on the camera information received in the step S402, the flash control unit 301 judges whether or not the camera 100 to which the flash apparatus 300 is connected supports the continuous shooting priority automatic light control mode. In a case where the camera 100 supports the continuous shooting priority automatic light control mode, the process proceeds to step S404, and when not, the process proceeds step S405.

In the step S404, the flash control unit 301 determines a display mode of a light emission mode selection screen to a display mode by which the user can select at least the continuous shooting priority automatic light control mode among the automatic light control mode, the continuous shooting priority automatic light control mode, and the manual light emission mode, which are light emission modes controllable by the flash apparatus 300. After that, the process proceeds to step S406.

In the step S405, the flash control unit 301 determines the display mode of the light emission mode selection screen to a display mode by which the user cannot select at least the continuous shooting priority automatic light control mode among the above mentioned light emission modes controllable by the flash apparatus 300. After that, the process proceeds to the step S406.

In the step S406, the flash control unit 301 displays a light emission mode which is now selectable by the user, on a light emission mode selection screen in the display mode determined in the step S404 or the step S405. The light emission mode selection screen may be displayed on either the flash display unit 304 or the camera display unit 106. To display the light emission mode selection screen on the camera display unit 106, the flash control unit 301 sends information on the light emission mode now selectable by the user to the camera control unit 101 via the flash contact group 109.

In the step S407, the flash control unit 301 sets or switches to the light emission mode selected on the light emission mode selection screen by the user. It should be noted that in a case where the light emission mode selection screen is displayed on the camera display unit 106 in the step S406, the user selects a light emission mode using the camera operating unit 105. In this case, the camera control unit 101 sends information on the user-selected light emission mode to the flash control unit 301 via the flash contact group 109, and the flash control unit 301 sets or switches to the light emission mode based on the received information.

In step S408, the flash control unit 301 sends the flash information received by the camera control unit 101 of the camera 100 in the step S202 in FIG. 2 and ends the present process.

By providing control described above, only in a case where the camera to which the flash apparatus 300 is connected supports the continuous shooting priority automatic light control mode, a choice of the continuous shooting priority automatic light control mode is displayed on the light emission mode selection screen so that the user can select the continuous shooting priority automatic light control mode as a light emission mode.

Although the preferred embodiments of the present invention has been described, the present invention is not limited to the embodiments but may be modified and changed without departing from the spirits of the present invention. For example, in the embodiments described above, the camera 100 and the flash apparatus 300 are configured as separate apparatuses but may be configured as an integral unit.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-121069, filed Jun. 26, 2018, which is hereby incorporated by reference herein in its entirety.

What is claimed is:

1. An image pickup apparatus that is connected to a light-emitting apparatus and causes the light-emitting apparatus to emit light when shooting, comprising:
a memory device that stores a set of instructions; and
at least one processor that executes the instructions to:
obtain a light emission mode of the light-emitting apparatus from the light-emitting apparatus;
determine exposure control values including at least a shooting sensitivity for use in shooting in a first light emission mode in which automatic light control is performed; and
in a case where the obtained light emission mode of the light-emitting apparatus is a second light emission mode in which automatic light control for continuous shooting is performed, change the determined shooting sensitivity to a greater value before the automatic light control.

2. The image pickup apparatus according to claim 1, wherein the at least one processor further executes the instructions to set, as a setting mode for the shooting sensitivity, one of an manual setting mode in which the shooting sensitivity for use in shooting is set to a value set by a user and an automatic setting mode in which the shooting sensitivity is changed to the determined value,
wherein in a case where the obtained light emission mode is the second light emission mode and the manual setting mode is set, the setting mode is changed from the manual setting mode to the automatic setting mode.

3. The image pickup apparatus according to claim 2, wherein the at least one processor further executes the instructions to, in a case where the obtained light emission mode is the second light emission mode, disable changing, by the user, of a value of the shooting sensitivity for use in shooting.

4. The image pickup apparatus according to claim 3, wherein the at least one processor further executes the instructions to, in a case where changing of the shooting sensitivity is disabled, notify the user that changing of the shooting sensitivity has been disabled.

5. The image pickup apparatus according to claim 1, wherein the at least one processor further executes the instructions to notify the user of the changed shooting sensitivity.

6. A light-emitting apparatus that is connected to an image pickup apparatus and emits light when shooting is performed with the image pickup apparatus, comprising:
a memory device that stores a set of instructions; and
at least one processor that executes the instructions to:
set, as a light emission mode, one of a plurality of light emission modes including at least a first light emission mode in which automatic light control is performed and a second light emission mode in which automatic light control for continuous shooting is performed,
receive light emission modes supported by the image pickup apparatus; and
notify the image pickup apparatus of the set light emission mode,
wherein the plurality of light emission modes is selectable by the user independently of one another as the light emission modes that should be set, and
wherein in a case where the set light emission mode is the second light emission mode and the second light emission mode is not included in the received light emission modes supported by the image pickup apparatus, the first light emission mode is set, and the first light emission mode is notified to the image pickup apparatus as the set light emission mode.

7. The light-emitting apparatus according to claim 6, wherein in a case where the second light emission mode is not included in the received light emission modes, selection of the second light emission mode selectable by the user as the light emission mode to be set among the plurality of light emission modes, is disabled.

8. An image pickup system that is comprised of a light-emitting apparatus and an image pickup apparatus which takes a shot by causing the light-emitting apparatus to emit light, the image pickup system comprising:
a memory device that stores a set of instructions; and
at least one processor that executes the instructions,
wherein in the light-emitting apparatus, the at least one processor executes the instructions to:
set, as a light emission mode, one of a plurality of light emission modes including at least a first light emission mode in which automatic light control is performed and a second light emission mode in which automatic light control for continuous shooting is performed; and
notify the image pickup apparatus of the light emission mode set in the light emission mode among the plurality of light emission modes, and
wherein in the image pickup apparatus, the at least one processor executes the instructions to:
'determine exposure control values including at least a shooting sensitivity for use in shooting in the first light emission mode; and
in a case where the notified light emission mode is the second light emission mode, change the determined shooting sensitivity to a greater value before the automatic light control.

9. A control method for an image pickup apparatus that is connected to a light-emitting apparatus and causes the light-emitting apparatus to emit light when shooting, the method comprising:
obtaining a light emission mode of the light-emitting apparatus from the light-emitting apparatus;
determining exposure control values including at least a shooting sensitivity for use in shooting in a first light emission mode in which automatic light control is performed; and
in a case where the obtained light emission mode of the light-emitting apparatus is a second light emission mode in which automatic light control for continuous shooting is performed, changing the determined shooting sensitivity to a greater value before automatic light control.

10. A control method for a light-emitting apparatus that is connected to an image pickup apparatus and emits light when shooting is performed with the image pickup apparatus, the method comprising:
setting, as a light emission mode, one of a plurality of light emission modes including at least a first light emission mode in which automatic light control is performed and a second light emission mode in which automatic light control for continuous shooting is performed,
receiving light emission modes supported by the image pickup apparatus; and
notifying the image pickup apparatus of the set light emission mode,
wherein the plurality of light emission modes is selectable by the user independently of one another as the light emission modes that should be set, and
wherein in a case where the set light emission mode is the second light emission mode and the second light emission mode is not included in the received light emission modes supported by the image pickup apparatus, the first light emission mode is set, and the first light emission mode is notified to the image pickup apparatus as the set light emission mode.

11. An image pickup apparatus capable of shooting with a light-emitting apparatus emitting light, comprising:
a memory device that stores a set of instructions; and
at least one processor that executes the instructions to:
perform a photometry; and
set exposure control values,
wherein in a case where the exposure control values for use in shooting with the light-emitting apparatus emitting light are set according to a predetermined photometric result obtained by the photometry, at least one processor that executes the instructions to set the exposure control values varying according to whether a state of the light-emitting apparatus is a first automatic light control state or a second automatic light control state.

12. The image pickup apparatus according to claim 11, wherein the at least one processor further executes the instructions to:
based on the photometric result obtained by the photometry, determine an amount of light to be emitted when shooting is performed with the light-emitting apparatus emitting light,
wherein in a case where exposure control values for use in shooting with the light-emitting apparatus emitting light are to be set according to the predetermined photometric result obtained by the photometry:
in a case where the state of the light-emitting apparatus is the second automatic light control state, exposure control values is set to obtain higher exposure than in the case where the state of the light-emitting apparatus is the first automatic light control state; and
in the case where the state of the light-emitting apparatus is the second automatic light control state, the amount of light is determined to be emitted as a smaller value than in the case where the state of the light-emitting apparatus is the first automatic light control state.

13. The image pickup apparatus according to claim 12, the setting of the exposure control values is performed in a setting mode which is a manual setting mode in which exposure control values are set according to selecting operations performed by the user or an automatic setting mode in which exposure control values are set according to a photometric result obtained by the photometry; and
in a case where the state of the light-emitting apparatus is set as the second automatic light control state in a case where the setting mode is the manual setting mode, the setting mode shifts from the manual setting mode to the automatic setting mode.

14. The image pickup apparatus according to claim 11, wherein automatic light control is performed in the first automatic light control state and automatic light control for continuous shooting is performed in the second automatic light control state.

15. A control method for an image pickup apparatus capable of shooting with a light-emitting apparatus emitting light, the method comprising:
in a case where the exposure control values for use in shooting with the light-emitting apparatus emitting light are set according to a predetermined photometric result, setting the exposure control values varying according to whether a state of the light-emitting apparatus is a first automatic light control state or a second automatic light control state.

16. The control method according to claim 15, wherein automatic light control is performed in the first automatic light control state and automatic light control for continuous shooting is performed in the second automatic light control state.

\* \* \* \* \*